United States Patent
Chirhart

(10) Patent No.: US 9,817,638 B2
(45) Date of Patent: Nov. 14, 2017

(54) SYSTEMS AND METHODS FOR INJECTING CODE INTO AN APPLICATION

(71) Applicant: Symantec Corporation, Mountain View, CA (US)

(72) Inventor: Gary D. Chirhart, Milford, MI (US)

(73) Assignee: Symantec Corporation, Mountain View, CA (US)

( * ) Notice: Subject to any disclaimer, the term of this patent is extended or adjusted under 35 U.S.C. 154(b) by 350 days.

(21) Appl. No.: 14/142,446

(22) Filed: Dec. 27, 2013

(65) Prior Publication Data

US 2015/0186114 A1    Jul. 2, 2015

(51) Int. Cl.
  *G06F 9/44*    (2006.01)
  *G06F 9/45*    (2006.01)
  *G06F 9/445*   (2006.01)

(52) U.S. Cl.
  CPC ............ *G06F 8/30* (2013.01); *G06F 9/44505* (2013.01); *G06F 8/36* (2013.01); *G06F 8/38* (2013.01); *G06F 8/443* (2013.01); *G06F 9/4433* (2013.01); *G06F 9/44521* (2013.01)

(58) Field of Classification Search
  CPC .......... G06F 8/36; G06F 8/443; G06F 9/4433; G06F 9/44505; G06F 9/44521
  See application file for complete search history.

(56) References Cited

U.S. PATENT DOCUMENTS

| | | | | |
|---|---|---|---|---|
| 5,867,709 A * | 2/1999 | Klencke | ............. | G06F 9/44505 717/108 |
| 5,915,114 A * | 6/1999 | McKee | .................. | G06F 8/443 714/E11.2 |
| 5,950,190 A * | 9/1999 | Yeager | ............... | G06F 17/30572 |
| 6,026,237 A * | 2/2000 | Berry | .................. | G06F 9/44521 717/130 |
| 6,202,205 B1 * | 3/2001 | Saboff | ..................... | G06F 8/443 717/151 |
| 6,996,808 B1 * | 2/2006 | Niewiadomski | ...... | G06F 9/4426 712/E9.083 |
| 8,713,631 B1 * | 4/2014 | Pavlyushchik | ....... | G06F 21/566 726/1 |
| 9,116,717 B2 * | 8/2015 | Soeder | .................. | G06F 9/4426 |
| 9,170,908 B2 * | 10/2015 | Gluck | ................. | G06F 11/3636 |

(Continued)

OTHER PUBLICATIONS

How to: Change the Startup Object for an Application (Visual Basic), Visual Studio 2010, Microsoft, retrieved online on Sep. 18, 2017, pp. 1-2. Retrieved from the Internet: <URL: https://msdn.microsoft.com/en-us/library/17k74w0c(v=vs.100).aspx>.*

(Continued)

*Primary Examiner* — Hanh T Bui

(74) *Attorney, Agent, or Firm* — Holland & Hart LLP

(57) ABSTRACT

A computer-implemented method for injecting code into an application is described. In one embodiment, a metadata pointer is identified. The metadata pointer points to a first metadata section in an application startup file. The first metadata section includes application metadata. A second metadata section is created in the application startup file. The application metadata is copied to the second metadata section. The second metadata section includes copied application metadata. The copied application metadata in the second metadata section is modified. The metadata pointer is updated to point to the second metadata section.

16 Claims, 10 Drawing Sheets

(56) References Cited

U.S. PATENT DOCUMENTS

| | | | | |
|---|---|---|---|---|
| 9,483,295 B2* | 11/2016 | Gschwind | ............ | G06F 9/45516 |
| 9,489,229 B2* | 11/2016 | Gschwind | ............ | G06F 9/45516 |
| 2002/0120724 A1* | 8/2002 | Kaiser | ................. | H04L 41/0816 709/221 |
| 2002/0188595 A1* | 12/2002 | Underseth | ................. | G06F 8/36 |
| 2003/0131104 A1* | 7/2003 | Karamanolis | ..... | G06F 17/30067 709/225 |
| 2003/0191865 A1* | 10/2003 | De Armas | ............... | G06F 9/546 719/310 |
| 2004/0006765 A1* | 1/2004 | Goldman | .............. | G06F 9/4433 717/116 |
| 2004/0103393 A1* | 5/2004 | Reddy | ............... | G06F 17/30607 717/122 |
| 2004/0103408 A1* | 5/2004 | Chilimbi | .............. | G06F 8/4442 717/130 |
| 2005/0193383 A1* | 9/2005 | Gryko | .................. | G06F 9/4433 717/163 |
| 2006/0070040 A1* | 3/2006 | Chilimbi | .............. | G06F 8/4442 717/130 |
| 2011/0145712 A1* | 6/2011 | Pontier | .................. | G06F 9/541 715/738 |
| 2011/0213751 A1* | 9/2011 | Iorio | .................. | G06F 12/1458 707/602 |
| 2012/0005467 A1* | 1/2012 | Butler | ................... | G06F 9/4416 713/2 |
| 2012/0233612 A1* | 9/2012 | Beckett | ............... | G06F 9/45533 718/1 |
| 2012/0272212 A1* | 10/2012 | Lu | ....................... | G06F 9/44521 717/110 |
| 2014/0173571 A1* | 6/2014 | Gluck | ................. | G06F 11/3636 717/130 |
| 2015/0135161 A1* | 5/2015 | Orcutt | ................. | G06F 9/44521 717/109 |
| 2015/0277870 A1* | 10/2015 | Gschwind | ........... | G06F 9/45516 717/153 |
| 2015/0277872 A1* | 10/2015 | Gschwind | ........... | G06F 9/45516 717/153 |
| 2016/0179475 A1* | 6/2016 | Velummylum | ........... | G06F 8/30 717/106 |

OTHER PUBLICATIONS

Edgar A. Leon et al., Cache Injection for Parallel Applications, ACM, 2011, retrieved online on Sep. 18, 2017, pp. 15-26. Retrieved from the Internet: <URL: http://delivery.acm.org/10.1145/2000000/1996135/p15-leon.pdf?.*

PCT/US2014/072079—International Search Report and the Written Opinion, dated Apr. 8, 2015.

Shelley Powers, Jerry Peek, Tim O'Reilly, Mike Loukides: "Unix Power Tools, Third Edition", Oct. 1, 2002, ISBN: 9780596003302, pp. 748-749, Section 36.8.

* cited by examiner

SYSTEMS AND METHODS FOR INJECTING CODE INTO AN APPLICATION

BACKGROUND

The use of computer systems and computer-related technologies continues to increase at a rapid pace. This increased use of computer systems has influenced the advances made to computer-related technologies. Indeed, computer systems have increasingly become an integral part of the business world and the activities of individual consumers. Computer systems may be used to carry out several business, industry, and academic endeavors. The wide-spread use of computers has been accelerated by the increased use of computer networks, including the Internet.

Computer systems may host applications for use by end users. Users may use these applications to perform various functionalities. In many cases, applications are written to provide broad functionality to as many users as possible. However, in many cases, it may be desirable to modify an application to meet certain specifications. For example, enterprises may desire to modify an application to reduce security risks and/or increase the ability to manage data or functionalities of the application.

SUMMARY

According to at least one embodiment, a computer-implemented method for injecting code into an application is described. In one embodiment, a metadata pointer may be identified. The metadata pointer may point to a first metadata section in an application startup file. The first metadata section may include application metadata. A second metadata section may be created in the application startup file. The application metadata may be copied to the second metadata section. The second metadata section may include copied application metadata. The copied application metadata in the second metadata section may be modified. The metadata pointer may be updated to point to the second metadata section.

In some embodiments, the second metadata section may be created at an end of the application startup file. For example, the second metadata section may be the last item in the application startup file.

In some embodiments, modifying the copied application metadata may include modifying the copied application metadata to load an injected object. In some cases, modifying the copied application metadata may include determining an application startup object. In one example, the application startup object may be determined based on an entry point instruction or a reference in a disparate file. In some cases, modifying the copied application metadata may include identifying constructor code for the application startup object in the copied application metadata based on the determined application startup object. In some cases, modifying the copied application metadata to load the injected object includes modifying the constructor code for the application startup object to load the injected object as a first step in creating the application startup object. In one example, modifying the copied application metadata to load the injected object includes modifying a constructor code pointer that points to the constructor code for creating the startup object to point to modified constructor code. In one example, the modified constructor code may be appended (at the end, for example) to the application startup file.

In some embodiments, modifying the copied application metadata to load the injected object includes modifying at least one stream in the copied application metadata. In some embodiments, modifying the copied application metadata to load the injected object includes modifying the copied application metadata to define a constructor for loading the injected object. In some embodiments, modifying the copied application metadata to load the injected object includes modifying the copied application metadata to add a reference to code for implementing the injected object. In some embodiment, modifying the copied application metadata to load the injected object includes modifying the copied application metadata to specify an object name within the code.

In some embodiments, the application startup file may be determined. In one example, the application startup file may be determined based on an executable file or a disparate file.

In some embodiments, the application startup file comprises a portable executable file. For example, the application startup file may be in the format of a portable executable file.

In some embodiments, the first metadata section may be a .NET metadata section. In some embodiments, the second metadata section may be a .NET metadata section.

A computing device configured for injecting code into an application is also described. The computing device may include a processor and memory in electronic communication with the processor. The memory may store instructions that when executed by the processor cause the processor to identify a metadata pointer, wherein the metadata pointer points to a first metadata section in an application startup file, wherein the first metadata section includes application metadata, create a second metadata section in the application startup file, copy the application metadata to the second metadata section, wherein the second metadata section includes copied application metadata, modify the copied application metadata in the second metadata section, and update the metadata pointer to point to the second metadata section.

A computer-program product for injecting code into an application is also described. The computer-program product may include a non-transitory computer-readable medium that stores instructions. The instructions may be executable by a processor to identify a metadata pointer, wherein the metadata pointer points to a first metadata section in an application startup file, wherein the first metadata section includes application metadata, create a second metadata section in the application startup file, copy the application metadata to the second metadata section, wherein the second metadata section includes copied application metadata, modify the copied application metadata in the second metadata section, and update the metadata pointer to point to the second metadata section.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

Figure 1:
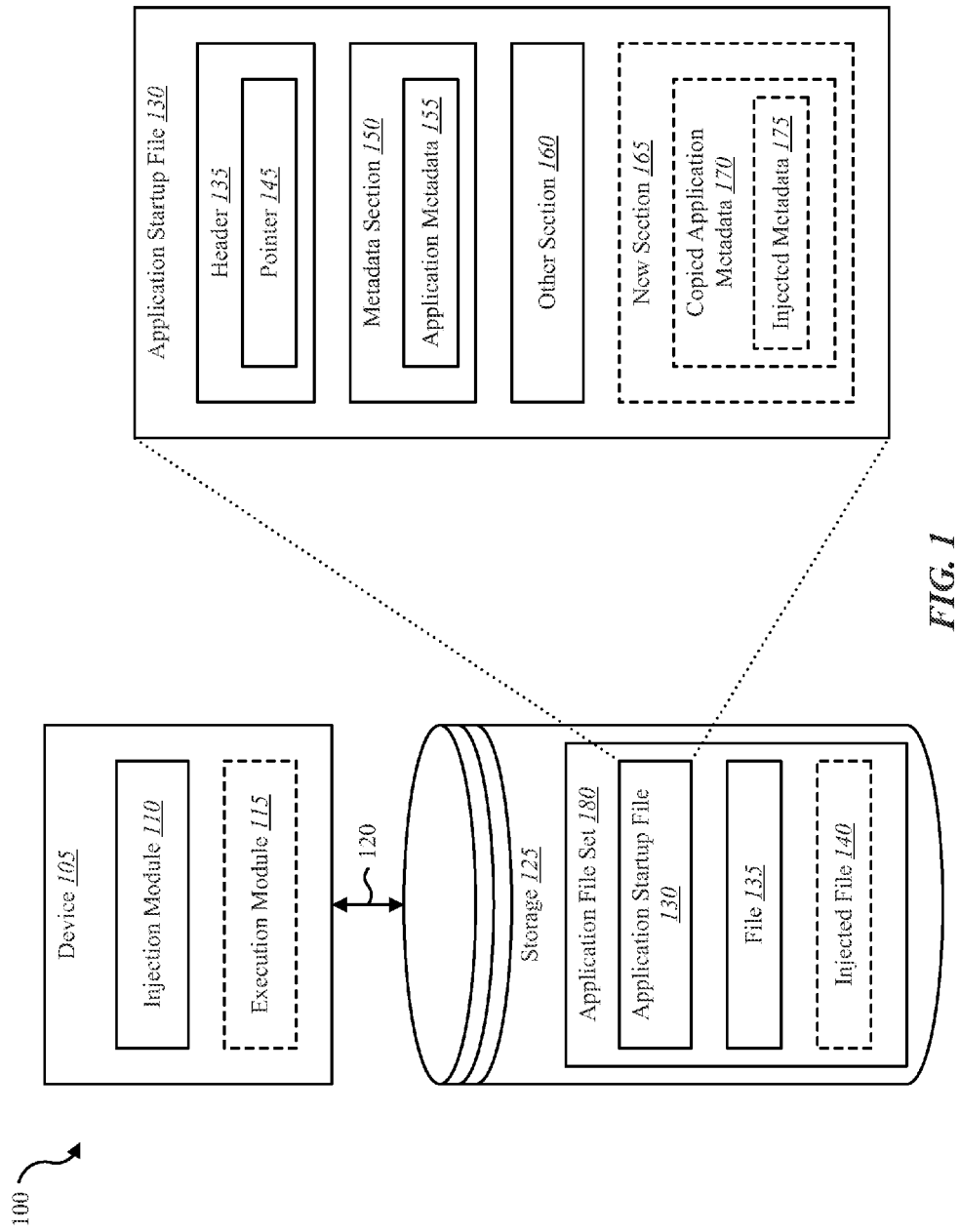
FIG. 1 is a block diagram illustrating one embodiment of an environment in which the present systems and methods may be implemented.

While the embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

The systems and methods described herein relate to injecting code into an application. In one example, the systems and methods described herein may relate to injecting code into a .NET application (an application that is at least partially implemented using the .NET Framework, for example). For instance, the systems and methods described herein may be used to inject code into a Microsoft Silverlight application (e.g., Windows Phone application).

In various situations, it may be desirable to alter the operation of an application. For example, in enterprise environments, it may be desirable to add various management and/or security policies to a preexisting application. Management and/or security policies may be added to a preexisting application by rewriting the preexisting application to include management and/or security policies or by wrapping the preexisting application in an additional layer that implements the desired management and/or security policies. If application wrapping is used, the desired management and/or security policies may be implemented without changing the preexisting application.

Application wrapping typically involves loading the wrapping code into the application process early in the application startup process. In one example, wrapping code may be loaded early in the application startup process by modifying the import address table (IAT) of a portable executable (PE). The IAT may load one or more dynamic-link libraries (DLLs) at startup. By modifying the IAT, additional DLLs (for implementing the application wrapping, for example) may be loaded. However, in some cases (e.g., Windows Phone .NET applications), the IAT may only reference DLLs in the system directory; furthermore access to the system directory may be prohibited (prohibiting the addition of DLLs to the system directory, for example). As a result, wrapping code cannot be loaded by modifying the IAT. The systems and methods described herein may overcome the above noted challenges. For example, the systems and methods described herein may be used to inject code (to load wrapping code, for example) into a .NET application. In some cases, the system and methods described herein may be used as an alternative to injecting code via IAT modification. For example, the systems and methods described herein may be used to inject code when the injected code is itself .NET based.

FIG. 1 is a block diagram illustrating one embodiment of an environment 100 in which the present systems and methods may be implemented. Environment 100 may include a device 105 and storage 125. Examples of devices include computers, servers, personal computing devices, mobile devices, smart phones, etc. The device 105 may be coupled to the storage 125 via connection 120. Examples of connections 120 include local buses, local area networks (LAN), wide area networks (WAN), the Internet, etc. In one example, the storage 125 may be internal to the device 105. In another example, the storage 125 may be external to the device (e.g., network attached storage). Storage 125 may store one or more files. Examples of files include portable execution files, application startup files 130, and/or other files (e.g., files 135, injected files 140). In one example, the portable execution files, application startup files 130, and/or other files may be included in an application file set 180. In some cases, the application file set 180 may be the installation file format (e.g., .XAP for Windows Phone, .zip, package, etc.)

The device 105 may include an injection module 110. In one example, the injection module 110 may inject code into a file. For example, the injection module 110 may inject code into a application file set 180 and/or an application startup file 130. In one example, the application startup file 130 and/or other files may be in the form of a portable executable file (e.g., .exe file, .dll file, etc.). In one example, the application file set 180 may be the application file set for running a third party application. In one example, the application startup file 130 may be the file (e.g., assembly file, DLL) that starts the execution of the application. In one embodiment, files 135 and/or injected files 140 may be dynamic-link library (DLL) files. In some cases, the application startup file 130 and/or the application file set 180 may be based on the .NET framework.

In one configuration, the application startup file 130 may include a plurality of sections. For example, the application startup file 130 may include one or more header sections 135, a metadata section 150, and one or more other sections. In one example, the header section 135 may be a .NET header section 135. The header section 135 may include a pointer 145 that points to the location of the metadata section 150 (e.g., a .NET metadata section). In one example, the metadata section 150 may include application metadata 155 (e.g., .NET application metadata).

In one example, the injection module 110 may inject code into the application file set 180 by modifying the application metadata 155. However, modifying the application metadata 155 included in the metadata section 150 (directly modifying the application metadata 155, for example) may present a variety of challenges.

One of the challenges associated with directly modifying the application metadata 155 relates to updating links and references within the application startup file 130. The application startup file 130 may include a plurality of location specific links or references. In one example, a location specific link or reference may be based on the location of the link or reference within the application startup file 130. As a result, modifying the location of a link or reference within the application startup file 130 (due to the insertion of metadata, for example) may necessitate updating of the link or reference to reflect the new location. Since, the metadata section 150 may precede one or more sections (e.g., other section 160), directly modifying the application metadata 155 in the metadata section 150 (to inject code, for example) may necessitate updating of each location specific link or reference in the subsequent sections (e.g., other section 160). In some cases, updating location specific links or references may be time consuming and/or error prone.

In one example, the injection module 110 may create a new section 165 in the application startup file 130. The new section 165 may be created at the end of the application startup file 130 so that there are no subsequent location specific links or references to modify as a result of modifications to the new section 165. In one example, the injection module 110 may copy the application metadata 155 included in the metadata section 150 to the new section 165. The injection module 110 may save the copied application data in the new section 165 as copied application metadata 170. At the time the application metadata 155 is copied to the new section 165, the copied application metadata 170 may be an exact duplicate of the application metadata 155.

In one example, the injection module 110 may modify the copied application metadata 170. For example, the injection module 110 may modify the copied application metadata 170 to include injected metadata 175. In one example, the injected metadata 175 may reference and/or load one or more injected files 140. For example, the injected metadata 175 may trigger the application to load wrapping code in connection with the startup of the application (to wrap the application, for example).

In one example, the injection module 110 may modify the pointer 145 to point to the new section 165 instead of the metadata section 150. As a result the copied application metadata 170 that has been modified to include injected metadata 175 may be executed instead of the application metadata 155 in the metadata section 150. In the case that the injected metadata 175 and injected files 140 correspond to wrapping code, the application may be executed as a wrapped application when the pointer 145 is pointed to the new section 165 or may be executed normally (without application wrapping) when the pointer 145 points to the metadata section 150.

In one example, the device 105 may include an execution module 115. In some embodiments, the execution module 115 may execute the application by processing the application startup file 130. In one example, the execution module 115 may process the metadata pointed to by the pointer 145 and may execute the application based on the pointed to metadata. In the systems and methods described herein the pointer 145 may be modified to point to the copied application metadata 170 that has been modified to include the injected metadata 175.

Figure 2:
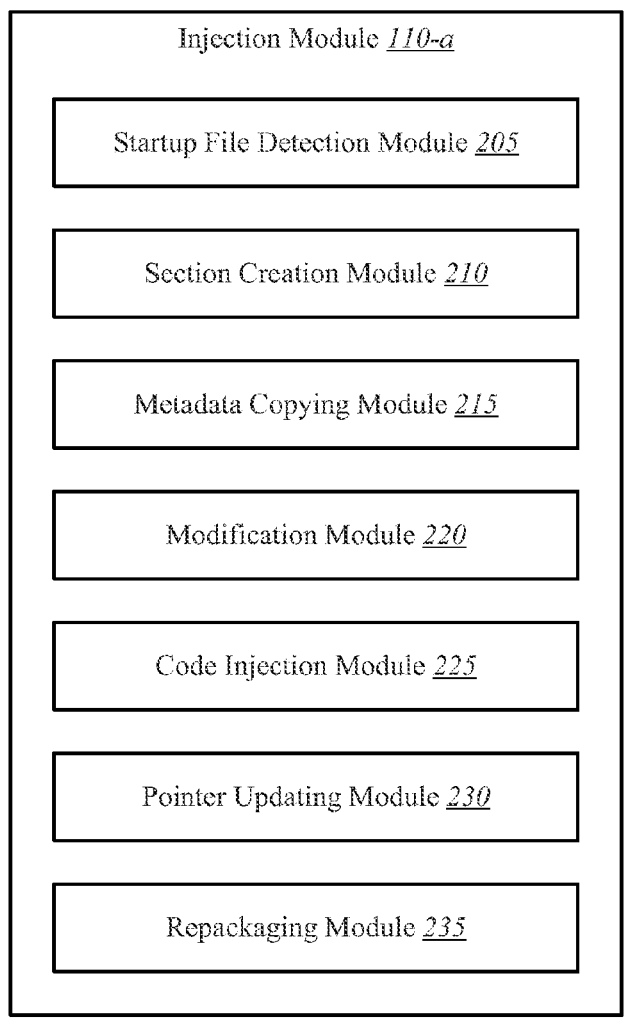
FIG. 2 is a block diagram illustrating one example of an injection module.

FIG. 2 is a block diagram illustrating one example 200 of an injection module 110-*a*. The injection module 110-*a* may be one example of the injection module 110 illustrated in FIG. 1. The injection module 110-*a* may include a startup file detection module 205, a section creation module 210, a metadata copying module 215, a modification module 220, a code injection module 225, a pointer updating module 230, and a repackaging module 235. At least some of the operations and functions of the injection module 110-*a* may be performed by or in conjunction with modules 205-235.

In one embodiment, the startup file detection module 205 may detect the application startup file (e.g., application startup file 130). The application startup file may be the first file that is executed in the application startup process. Additionally or alternatively, the application startup file may be the file that includes the .NET metadata for setting up the startup object (e.g., the object that starts execution of the application). In one example, the startup file detection module 205 may detect the application startup file based on an application manifest file (e.g., WMAppManifest.xml). For instance, the startup file detection module 205 may detect the application startup file based on the application startup file that is referenced as the startup file in the application manifest file (the first assembly file referenced, for example). In another example, the startup file detection module 205 may determine that the application startup file may be the lone executable file (e.g., .EXE file) in the application file set.

In one embodiment, the section creation module 210 may create a new section (e.g., new section 165) in the application startup file. For example, the section creation module 210 may create the new section at the end of the application startup file. As described previously, the section creation module 210 may create the new section at the end of the application startup file to minimize the number of location-specific links or references that need to be updated. Creating the new section at the end of the application startup file may ensure that no location-specific links or references may be subsequent to the new section. Although, it is noted, that some updating of location-specific links or references may need to performed due to modifications within the new section.

In one embodiment, the metadata copying module 215 may copy the application metadata (e.g., application metadata 155) from the metadata section (e.g., metadata section 150) to the new section. As a result, prior to modification, the copied application metadata 170 may be an exact copy of the of the application metadata in the metadata section (the application may operate exactly the same regardless of whether the metadata being used is the application metadata from the metadata section of the copied application metadata from the new section, for example).

In one embodiment, the modification module 220 may modify the copied application metadata. For example, the modification module 220 may add (e.g., inject), remove, and/or modify metadata in the copied application metadata. In one example, the modification module 220 may enable injected code to be loaded in connection with the application. For example, the modification module 220 may enable for application wrapping of applications (e.g., applications implemented using a .NET framework). The modification module 220 is described in further detail below.

In one embodiment, the code injection module 225 may inject code into the application file set (e.g., application file set 180). For example, the code injection module 225 may insert one or more injected files (e.g., injected files 140) in the application file set. In one example, the injected files may be DLLs, assembly files, etc. In one example, the modifications to the application metadata may reference and execute code included in the injected files.

In one embodiment, the pointer updating module 230 may update the pointer (e.g., pointer 145) that points to the .NET metadata. For example, the pointer updating module 230 may update the pointer to point to the copied application metadata in the new section (after the copied application metadata has been modified, for example). In one example, the pointer updating module 230 may update the pointer back to the application metadata in the metadata section for execution of the application without the injected code. In one example, this may allow for simple switching between running the application as a wrapped application or running the application without any wrapping.

In one embodiment, the repackaging module 235 may repackage the application file set so that it includes the injected files 140. For example, the repackaging module 235 may repackage the application startup file, and other files (e.g., files 135, injected files 140) into a single file (e.g., .exe, .zip, .xap, etc.).

Figure 3:
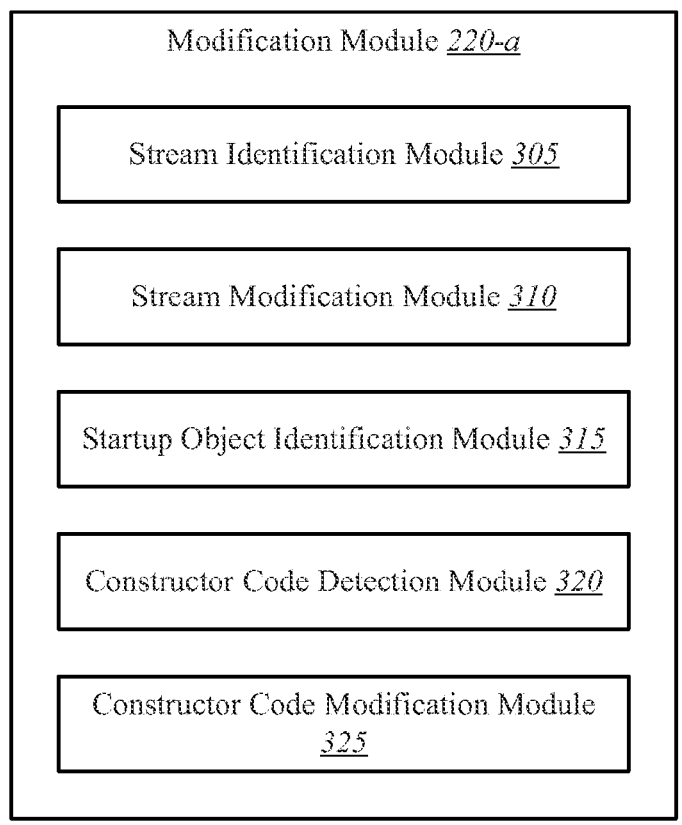
FIG. 3 is a block diagram illustrating one example of a modification module.

FIG. 3 is a block diagram illustrating one example 300 of a modification module 220-*a*. The modification module 220-*a* may be one example of the modification module 220 illustrated in FIG. 2. The modification module 220-*a* may include a stream identification module 305, a stream modification module 310, a startup object identification module 315, a constructor code detection module 320, and a constructor code modification module 325. At least some of the operations and functions of the modification module 220-*a* may be performed by or in conjunction with modules 305-325.

In one embodiment, the stream identification module 305 may identify one or more streams in the application metadata (e.g., .NET application metadata). For example, the stream identification module 305 may identify the # Strings stream and/or the #~stream in the .NET metadata. In some embodiments, the stream identification module 305 may also identify one or more tables within a stream. For example, the stream identification module 305 may identify the AssemblyRef table in the #~stream, the TypeRef table in the #~stream, the MemberRef table in the #~stream, and/or the MethodDef table in the #~stream.

In one embodiment, the stream modification module 310 may modify (e.g., add, remove, or change) metadata in a stream. For example, the stream modification module 310 may modify metadata in various streams so that at least one injected object may be properly constructed to be loaded as part of the application. In one example, the stream modification module 310 may modify metadata in the # Strings stream, the AssemblyRef table in the #~stream, the TypeRef table in the #~stream, the MemberRef table in the #~stream, and/or the MethodDef table in the #~stream.

In one example, the stream modification module 310 may add names (e.g., strings) for the injected assembly file (e.g., wrap assembly), the injected file namespace (e.g., wrap namespace), and/or the injected object (e.g., wrap object). These names may be referenced by one or more other streams.

In one example, the stream modification module 310 may modify metadata in the AssemblyRef table within the #~stream to add information about the injected assembly file (e.g., injected DLL file). The information about the injected assembly file may reference the injected assembly file. In one example, the information about the injected assembly file may include version information for the injected assembly file. The modified metadata in the AssemblyRef table may reference one or more of the names added to the # Strings stream. For example, the information about the injected assembly file may reference the name of the injected assembly file that was added in the # Strings stream.

In one example, the stream modification module 310 may modify metadata in the TypeRef table within the #~stream to add a type reference for the injected object (e.g., object type). The new type reference may reference the information about the injected assembly file that was added in the AssemblyRef table. The new type reference may also reference the injected file namespace and/or the injected object. In one example, the type reference may indicate the class of objects that may created.

In one example, the stream modification module 310 may modify the metadata in the MemberRef table within the #~stream to add the constructor for the injected object. The constructor may reference the new type referenced in the TypeRef table. The constructor may enable the injected object to be created using the new type reference set forth in the TypeRef table and properly referencing the injected assembly file set forth in the AssemblyRef table.

In some cases, the stream modification module 310 may update a counter for the number of rows in a table in the #~stream based on the modifications to the table. For example, the stream modification module 310 may increase the counter for the number of rows in a table when an additional row is added to the table and may decrease the counter for the number of rows in the table when a row is removed from the table. In some cases, each counter for the number of rows in a table may need to be correct for proper referencing within the application startup file.

In one embodiment, the constructor code detection module 320 may detect the constructor for the startup object (e.g., the object that creates the application). In some cases, the constructor code detection module 320 may detect the constructor code for the startup object by identifying the startup object. In one example, the startup object may be referenced in a manifest file. For example, the startup object may be referenced as being the entry object in the manifest file. In another example, the startup object may be identified based on an entry point instruction identified in the application startup file. Once the startup object has been identified (based on the manifest file or an entry point instructions, for example), the MemberRef table within the #~stream may be searched for the constructor for the startup object. Upon finding the constructor for the startup object in the MemberRef table, the constructor code detection module 320 may detect the constructor code for the startup object.

In one embodiment, the constructor code modification module 325 may modify the detected constructor code for the startup object. For example, the constructor code modification module 325 may modify the detected constructor code to load the injected object (using the constructor created for the injected object, for example) as the first step in creating the startup object. This may enable the injected code to be loaded in connection with the application. In one example, this may allow a third party application (that is implemented using .NET, for example) to be wrapped with injected code (e.g., management and/or security policies).

In some embodiments, the modification module 220-*a* may additionally modify the manifest file (e.g., WMAppManifest.xml) to reference the added assembly files. In some cases, the AppManifest.xaml file may be modified to add the .NET object as a deployed assembly. In some cases, one or both of these steps may be performed to resign the package.

Figure 4:
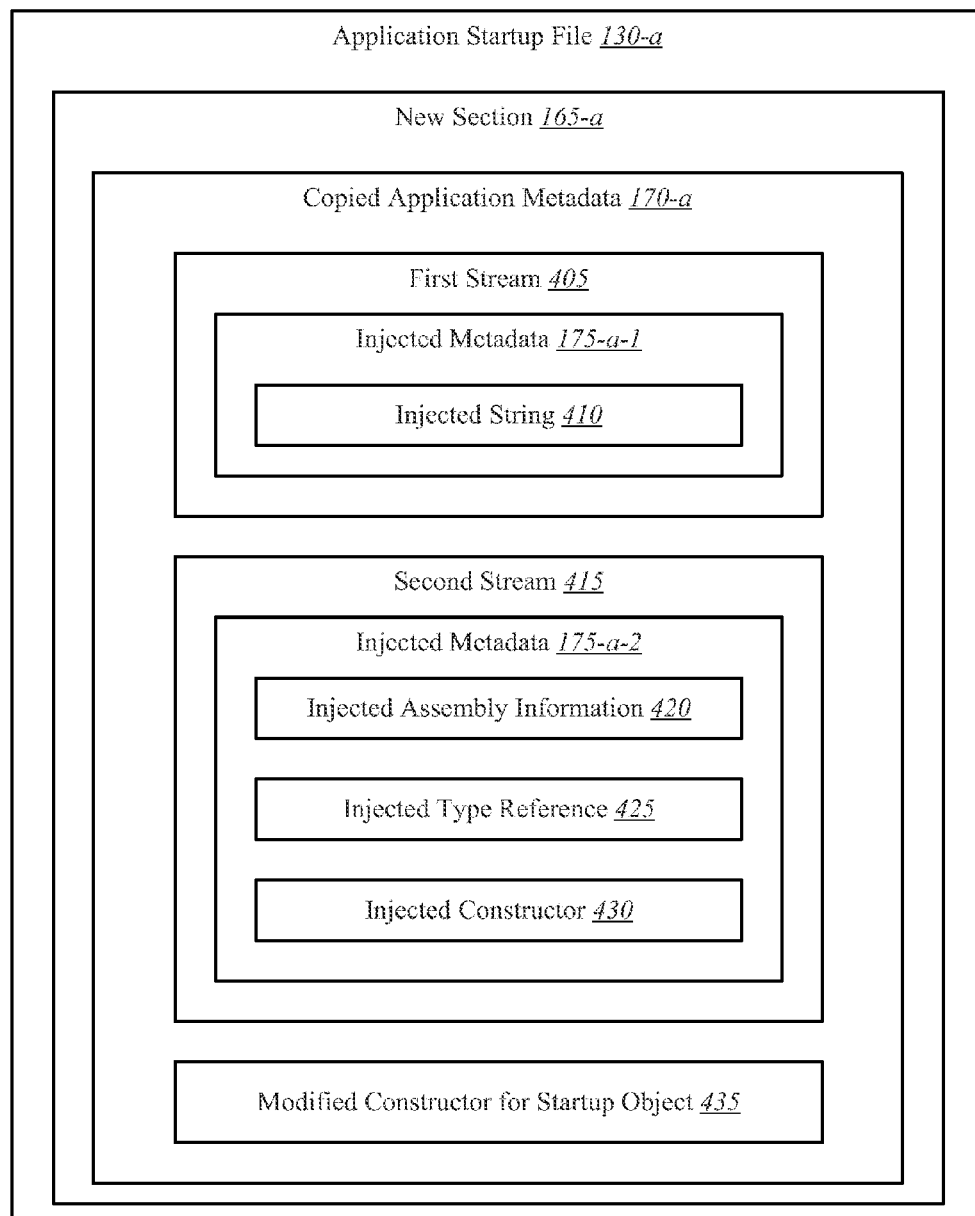
FIG. 4 is a block diagram illustrating one example of the new section 165 within the application startup file.

FIG. 4 is a block diagram illustrating one example 400 of a new section 165-*a* within an application startup file 130-*a*. The application startup file 130-*a* may be an example of the application startup file 130 illustrated in FIG. 1. As described previously, the new section 165-*a* may include copied application metadata 170-*a*. In this example, the copied application metadata 170-*a* may include a first stream 405 and a second stream 415. In one example, the first stream 405 may be a # Strings stream and the second stream 415 may be the #~stream. As described previously, the first stream 405 may include injected metadata 175-*a*-1. The injected metadata 175-*a*-1 may include one or more injected strings 410. For example, the one or more injected strings 410 may include strings for the name of the wrap assembly, the name of the wrap namespace, and/or the name of the wrap object.

In one example, the second stream 415 may also include injected metadata 175-*a*-2. For example, the injected metadata 175-*a*-2 may include injected assembly information 420

(included in the AssemblyRef table, for example), an injected type reference 425 (included in the TypeRef table, for example), and/or an injected constructor 430 (included in the MemberRef table, for example). As described previously, the injected metadata in the first and second streams may allow for the creation an injected object. In one example, the second stream 415 may additionally include a modified constructor pointer for a startup object 435 (the modified constructor pointer may be in the MemberRef table, for example). As described previously, a modified constructor for the startup object 435 (that is appended to the copied application metadata 170-a in the new section 165-a, for example) may load the injected object as the first step in creating the startup object.

Figure 5:
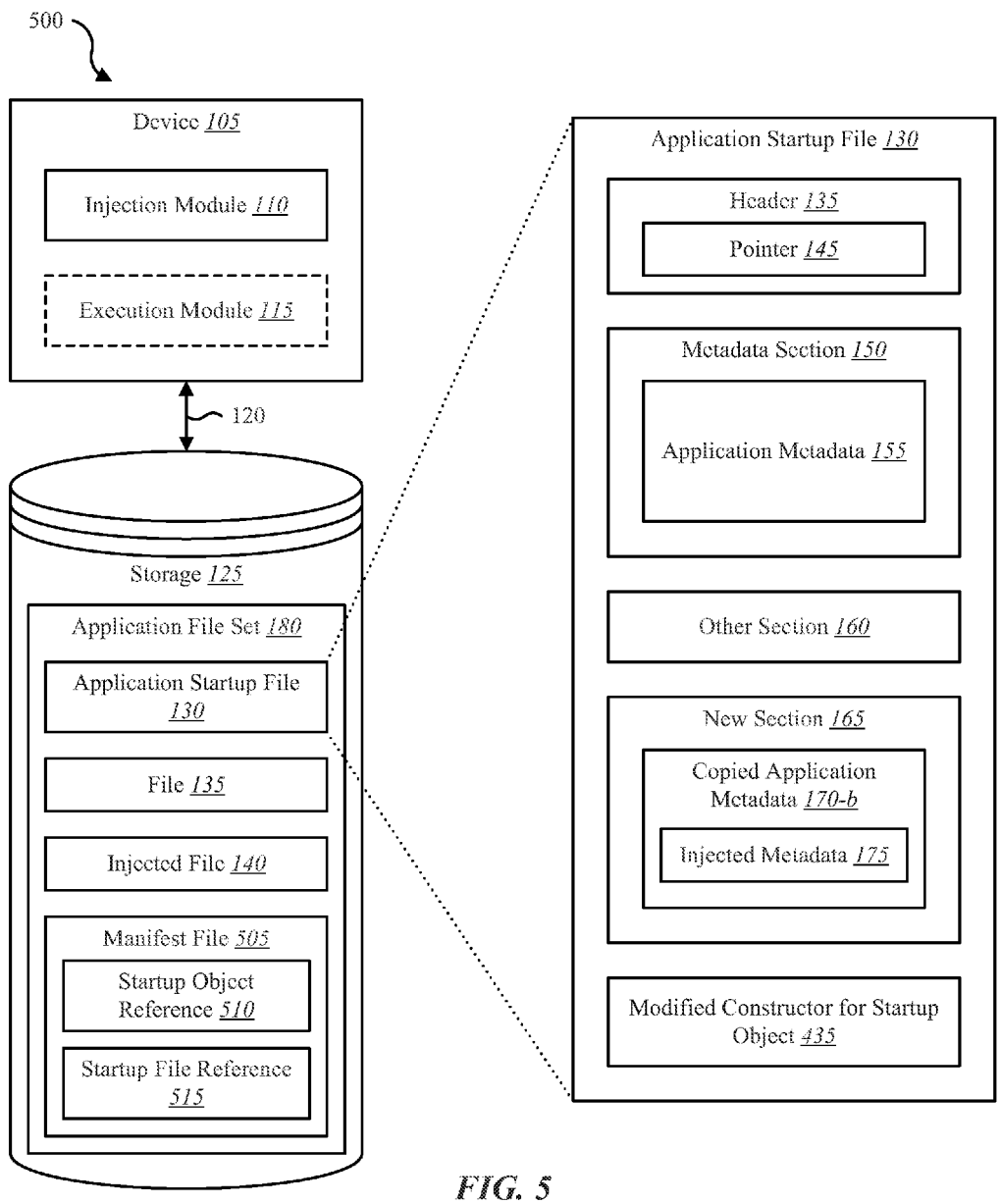
FIG. 5 is a block diagram illustrating one embodiment of the systems and methods described herein.

FIG. 5 is a block diagram illustrating one embodiment 500 of the systems and methods described herein. The embodiment illustrated in FIG. 5 may be an example of the embodiment illustrated in FIG. 1. However, in the embodiment 500, a application file set 180 may include a manifest file 505 (e.g., WMAppManifest.xml). In one example, the inclusion of a manifest file 505 may correspond with the application file set 180 of a Windows phone application.

As described previously, the application file set 180 may include an application startup file 130, one or more files 135 (e.g., assembly files, DLL files). Additionally, the application file set 180 may include the manifest file 505. In one example, the manifest file 505 may include a startup object reference 510 and a startup file reference 515. In one example, startup object reference 510 may identify the startup object (e.g., entry point object) for the application. In one embodiment, the startup file reference may identify the application startup file (e.g., assembly file that includes the constructor code for creating the startup object).

In some embodiments, the injection module 110 may unpackage (e.g., unzip) the application file set 180 to inject code into the application file set 180. In one example, the injection module 110 may determine based on the startup file reference 505, which file 135 in the application file set 180 is the application startup file 130. Upon determining which file 135 is the application startup file 130, the injection module 110 may copy application metadata 155 from the metadata section and save copied application metadata 170-b in a new section 165 at the end of the application startup file 130. As described previously, the injection module 110 may modify the copied application metadata 170-b to include injected metadata 175 and may modify the application file set 180 to include one or more injected files 140 (e.g., assembly or DLL files). In one example, the injection module 110 may identify the constructor for the startup object based on the startup object reference 510 in the manifest file 505. As described previously, the injection module 110 may modify the constructor for startup object to create a modified constructor for startup object 435. In one example, the injected metadata may include a modified constructor pointer that points to the modified constructor for the startup object 435. In some cases, the modified constructor for the startup object 435 may be appended to the end of the application startup file 130 (at the end of the copied application metadata, in the new section, or in a different section, for example). As described previously, the modified constructor for startup object 435 may load the injected object as the first step in creating the startup object.

Figure 6:
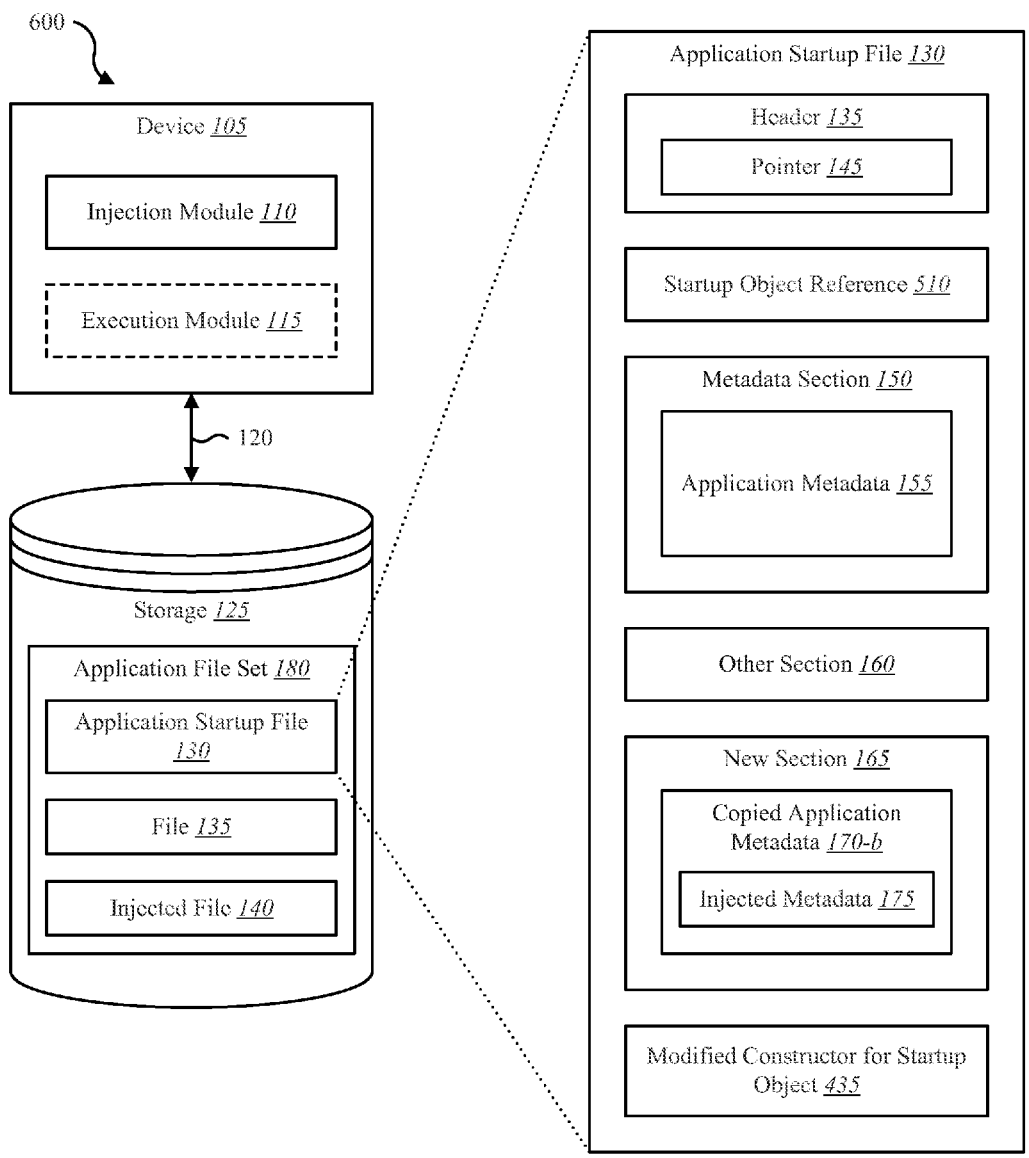
FIG. 6 is a block diagram illustrating one embodiment of the systems and methods described herein.

FIG. 6 is a block diagram illustrating one embodiment 600 of the systems and methods described herein. The embodiment illustrated in FIG. 6 may be an example of the embodiments illustrated in FIGS. 1 and/or 5. However, in the embodiment 600 (e.g., a non-phone .NET application), the application startup file 130 may be the lone .EXE file in the application file set 180. As a result, the injection module 110 may not need to determine the application startup file 130. In this example, the startup object reference 510 may be included in the application startup file 130. For example, the startup object reference 510 may be referenced by an entry point instruction. In one example, the inclusion of the startup object reference 510 in the application startup file 130 may correspond with the portable executable 180 of a Windows based .NET application. As described previously, the injection module 110 may inject metadata into the copied application metadata 170-b and may inject one or more injected files 140 into the application file set 180. In one example, the injection module 110 may use the startup object reference 510 to identify a constructor for the startup object. The injection module 110 may modify the constructor for the startup object to generate a modified constructor for startup object 435. In one example, the injected metadata may include a modified constructor pointer that points to the modified constructor for the startup object 435. In some cases, the modified constructor for the startup object 435 may be appended to the end of the application startup file 130 (at the end of the copied application metadata, in the new section, or in a different section, for example). In one example, the modified constructor for startup object 435 may load the injected object as the first step in creating the startup object.

Figure 7:
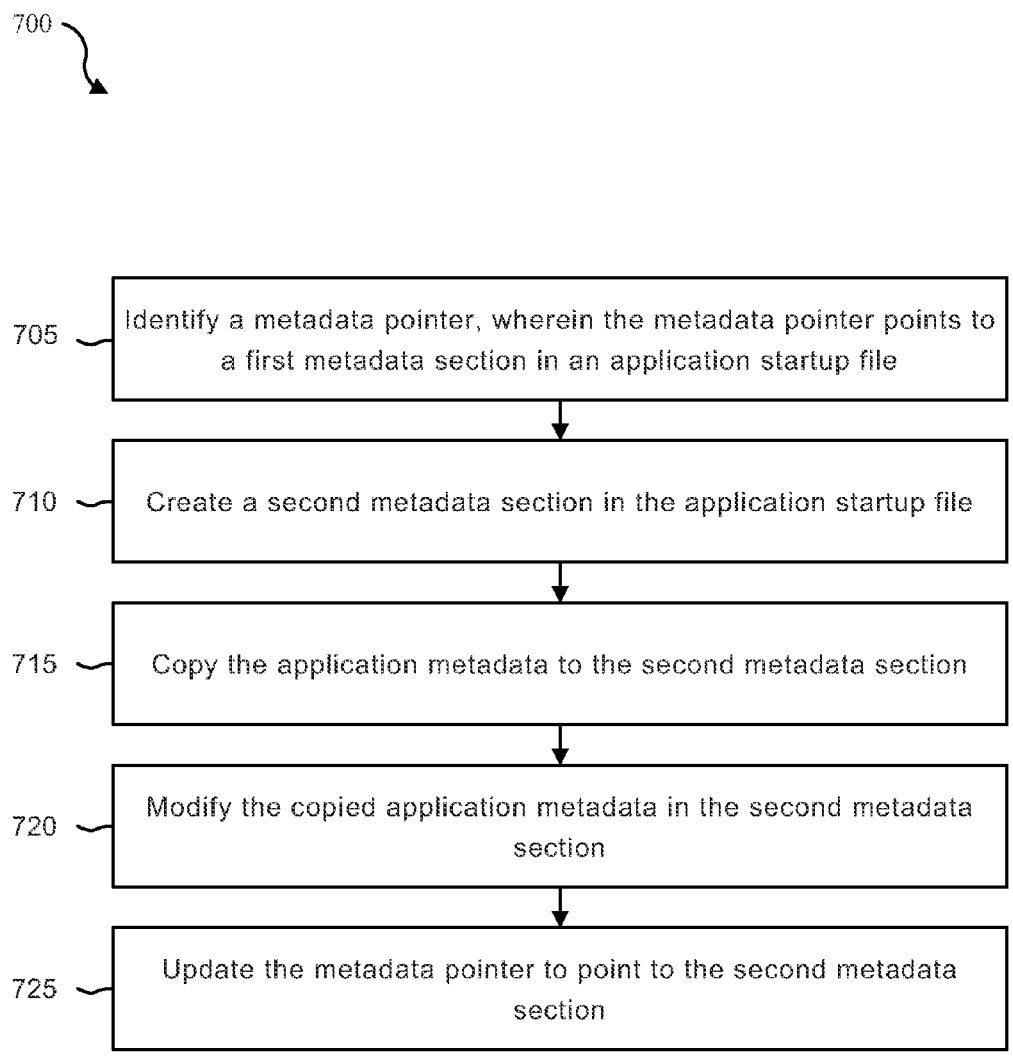
FIG. 7 is a flow diagram illustrating one embodiment of a method for injecting code into an application.

FIG. 7 is a flow diagram illustrating one embodiment of a method 700 for injecting code into an application. In some configurations, the method 700 may be implemented by injection module 110 illustrated in FIGS. 1, 2, 5, and/or 6.

At block 705, a metadata pointer may be identified. The metadata pointer may point to a first metadata section in an application startup file. At block 710, a second metadata section may be created in the application startup file. At block 715, the application metadata may be copied to the second metadata section. At block 720, the copied application metadata in the second metadata section may be modified. At block 725, the metadata pointer may be updated to point to the second metadata section.

Figure 8:
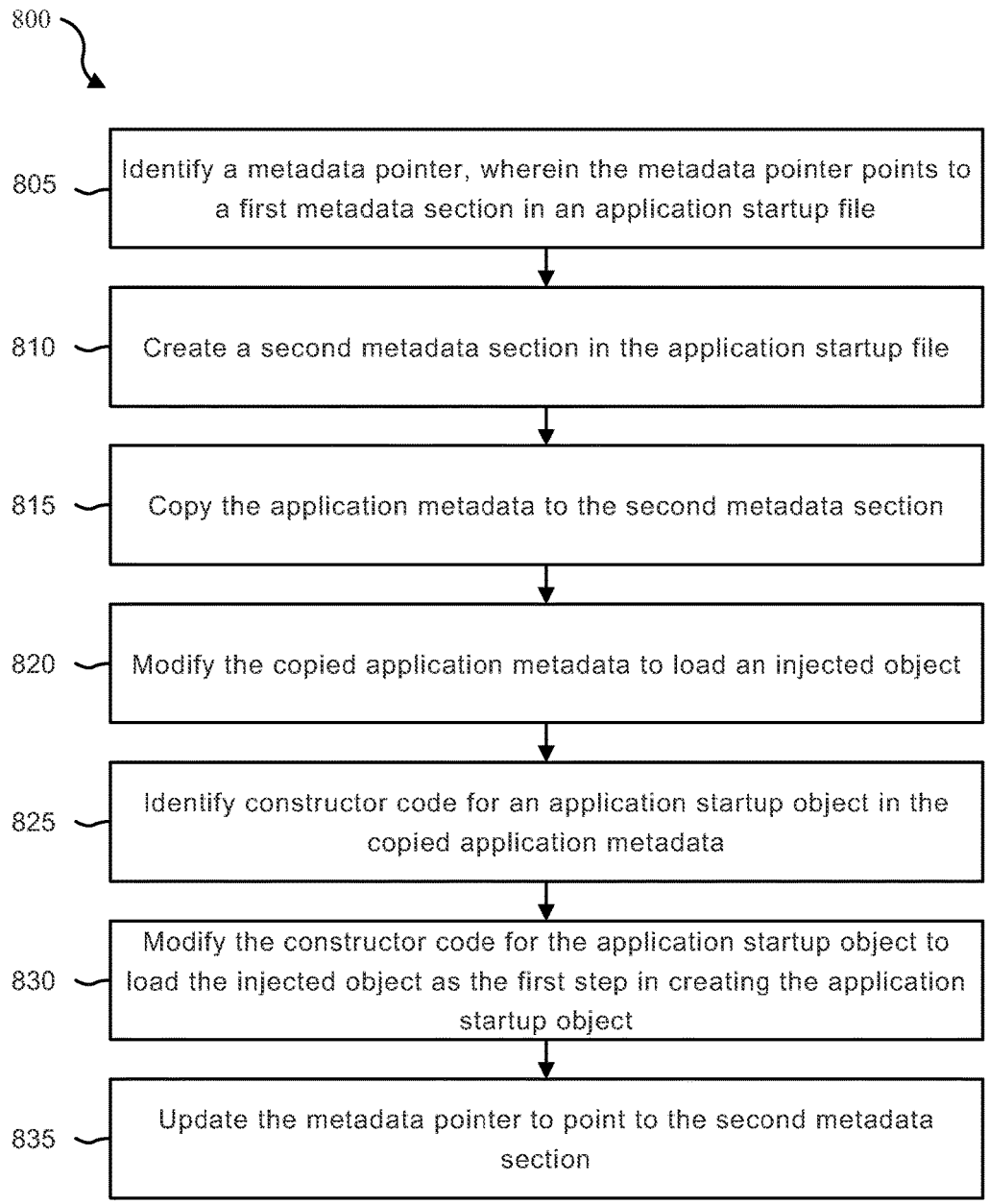
FIG. 8 is a flow diagram illustrating one embodiment of a method for injecting code into a .NET application.

FIG. 8 is a flow diagram illustrating one embodiment of a method 800 for injecting code into a .NET application. In some configurations, the method 800 may be implemented by injection module 110 illustrated in FIGS. 1, 2, 5 and/or 6.

At block 805, a metadata pointer may be identified. The metadata pointer may point to a first metadata section in an application startup file. At block 810, a second metadata section may be created in the application startup file. At block 815, the application metadata may be copied to the second metadata section. At block 820, the copied application metadata may be modified to load an injected object. At block 825, constructor code for an application startup object may be identified in the copied application metadata. At block 830, the constructor code for the application startup object may be modified to load the injected object as the first step in creating the application startup object. At block 835, the metadata pointer may be updated to point to the second metadata section.

Figure 9:
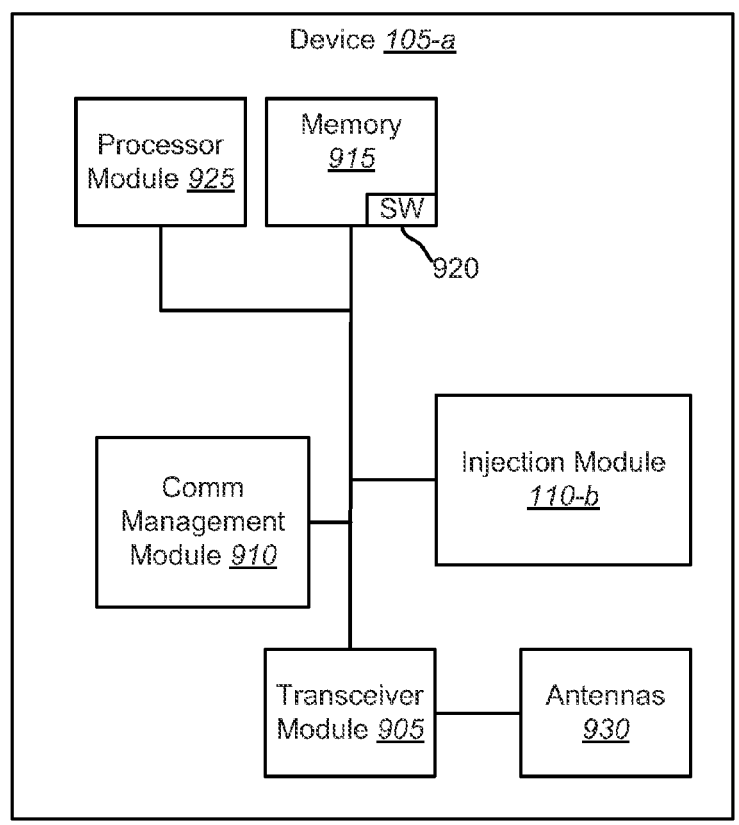
FIG. 9 is a block diagram illustrating an example of a device for injecting code into an application in accordance with various embodiments.

FIG. 9 is a block diagram 900 illustrating an example of a device 105-a for injecting code into an application in accordance with various embodiments. The device 105-a may have any of various configurations, such as a mobile device, tablet, or personal computer. The device 105-a may have an internal power supply, such as a small battery, to facilitate mobile operation. In some embodiments, the device 105-a may be the device 105 of FIGS. 1, 5, and/or 6.

The device 105-*a* may include antenna(s) 930, a transceiver module 905, memory 915, and a processor module 925, which each may be in communication, directly or indirectly, with each other (e.g., via one or more buses). The transceiver module 905 may be configured to communicate bi-directionally, via the antenna(s) 930 and/or one or more wired or wireless links, with one or more networks. For example, the transceiver module 905 may be configured to communicate bi-directionally with one or more enterprise servers. The transceiver module 905 may include a modem configured to modulate the packets and provide the modulated packets to the antenna(s) 930 for transmission, and to demodulate packets received from the antenna(s) 930.

The memory 915 may include random access memory (RAM) and read-only memory (ROM). The memory 915 may store computer-readable, computer-executable software code 920 containing instructions that are configured to, when executed, cause the processor module 925 to perform various functions described herein (e.g., identifying a pointer, creating a new section, copying metadata, modifying the copied metadata, updating the pointer, etc.). Alternatively, the software code 920 may not be directly executable by the processor module 925 but be configured to cause the computer (e.g., when compiled and executed) to perform functions described herein.

The processor module 925 may include an intelligent hardware device, e.g., a central processing unit (CPU), a microcontroller, an application-specific integrated circuit (ASIC), etc.

According to the architecture of FIG. 9, the device 105-*a* may further include a communications management module 910. The communications management module 910 may manage communications with one or more other devices. By way of example, the communications management module 910 may be a component of the device 105-*a* in communication with some or all of the other components of the mobile device 105-*a* via a bus. Alternatively, functionality of the communications management module 910 may be implemented as a component of the transceiver module 905, as a computer program product, and/or as one or more controller elements of the processor module 925.

According to the architecture of FIG. 9, the device 105-*a* may further include an injection module 110-*b*. The injection module 110-*b* may be one example of the injection module 110 illustrated in FIGS. 1, 2, 5, and/or 6. As described above, the injection module 110-*b* may implement the systems and methods described herein.

Figure 10:
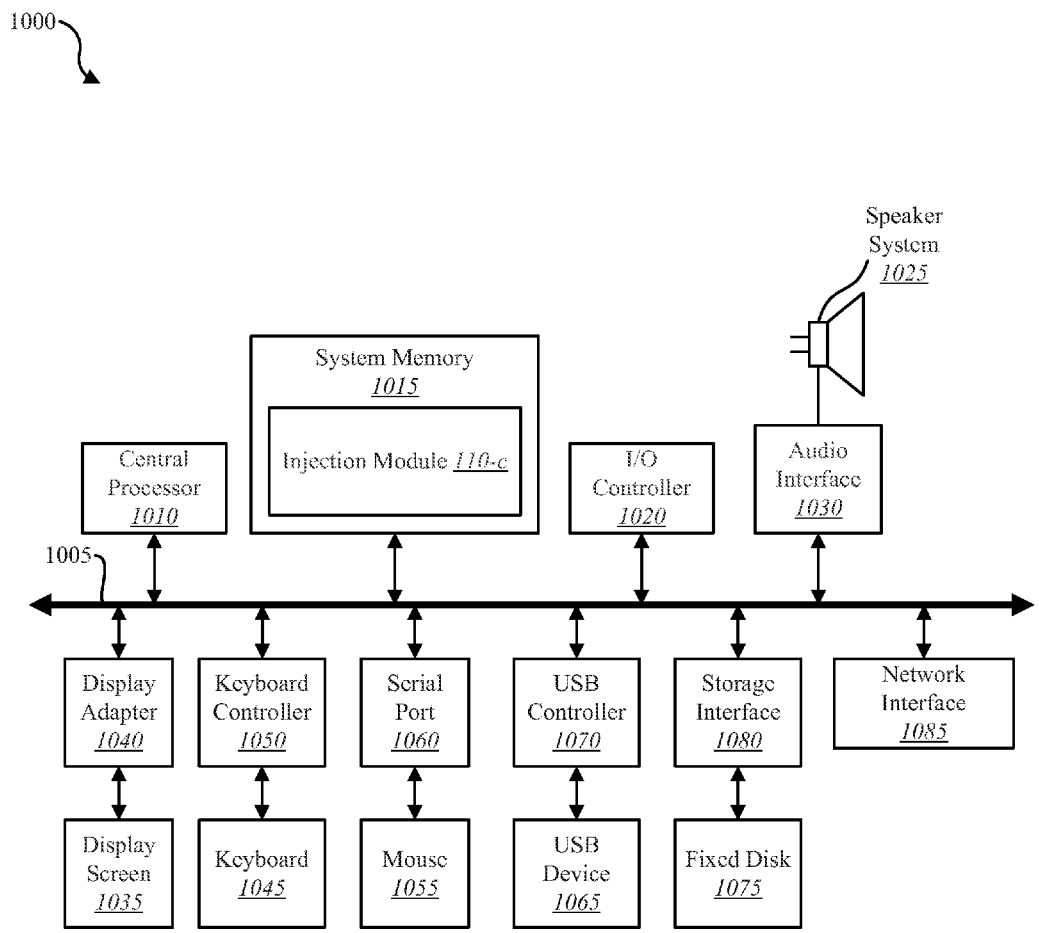
FIG. 10 depicts a block diagram of a computer system suitable for implementing the present systems and methods.

FIG. 10 depicts a block diagram of a computer system 1000 suitable for implementing the present systems and methods. Computer system 1000 may be one example of device 105 illustrated in FIGS. 1, 5, 6, and/or 9. Computer system 1000 includes a bus 1005 which interconnects major subsystems of computer system 1000, such as a central processor 1010, a system memory 1015 (typically RAM, but which may also include ROM, flash RAM, or the like), an input/output controller 1020, an external audio device, such as a speaker system 1025 via an audio output interface 1030, an external device, such as a display screen 1035 via display adapter 1040, a keyboard 1045 (interfaced with a keyboard controller 1050) (or other input device), multiple Universal Serial Bus (USB) devices 1065 (interfaced with a USB controller 1070), and a storage interface 1080. Also included are a mouse 1055 (or other point-and-click device) connected to bus 1005 through serial port 1060 and a network interface 1085 (coupled directly to bus 1005).

Bus 1005 allows data communication between central processor 1010 and system memory 1015, which may include read-only memory (ROM) or flash memory (neither shown), and random access memory (RAM) (not shown), as previously noted. The RAM is generally the main memory into which the operating system and application programs are loaded. The ROM or flash memory can contain, among other code, the Basic Input-Output system (BIOS) which controls basic hardware operation such as the interaction with peripheral components or devices. For example, injection module 110-*c* to implement the present systems and methods may be stored within the system memory 1015. Injection module 110-*c* may be one example of injection module 110 illustrated in FIGS. 1, 2, 5, 6, and/or 9. Applications resident with computer system 1000 are generally stored on and accessed via a non-transitory computer readable medium, such as a hard disk drive (e.g., fixed disk 1075) or other storage medium. Additionally, applications can be in the form of electronic signals modulated in accordance with the application and data communication technology when accessed via interface 1085.

Storage interface 1080, as with the other storage interfaces of computer system 1000, can connect to a standard computer readable medium for storage and/or retrieval of information, such as a fixed disk drive 1075. Fixed disk drive 1075 may be a part of computer system 1000 or may be separate and accessed through other interface systems. Network interface 1085 may provide a direct connection to a remote server via a direct network link to the Internet via a POP (point of presence). Network interface 1085 may provide such connection using wireless techniques, including digital cellular telephone connection, Cellular Digital Packet Data (CDPD) connection, digital satellite data connection, or the like.

Many other devices or subsystems (not shown) may be connected in a similar manner (e.g., document scanners, digital cameras, and so on). Conversely, all of the devices shown in FIG. 10 need not be present to practice the present systems and methods. The devices and subsystems can be interconnected in different ways from that shown in FIG. 10. The operation of a computer system such as that shown in FIG. 10 is readily known in the art and is not discussed in detail in this application. Code to implement the present disclosure can be stored in a non-transitory computer-readable medium such as one or more of system memory 1015 or fixed disk 1075. The operating system provided on computer system 1000 may be iOS®, MS-DOS®, MS-WINDOWS®, OS/2®, UNIX®, LINUX®, or another known operating system.

Moreover, regarding the signals described herein, those skilled in the art will recognize that a signal can be directly transmitted from a first block to a second block, or a signal can be modified (e.g., amplified, attenuated, delayed, latched, buffered, inverted, filtered, or otherwise modified) between the blocks. Although the signals of the above described embodiment are characterized as transmitted from one block to the next, other embodiments of the present systems and methods may include modified signals in place of such directly transmitted signals as long as the informational and/or functional aspect of the signal is transmitted between blocks. To some extent, a signal input at a second block can be conceptualized as a second signal derived from a first signal output from a first block due to physical limitations of the circuitry involved (e.g., there will inevitably be some attenuation and delay). Therefore, as used herein, a second signal derived from a first signal includes the first signal or any modifications to the first signal, whether due to circuit limitations or due to passage through other circuit elements which do not change the informational and/or final functional aspect of the first signal.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures can be implemented to achieve the same functionality.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

Furthermore, while various embodiments have been described and/or illustrated herein in the context of fully functional computing systems, one or more of these exemplary embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the exemplary embodiments disclosed herein.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the present systems and methods and their practical applications, to thereby enable others skilled in the art to best utilize the present systems and methods and various embodiments with various modifications as may be suited to the particular use contemplated.

Unless otherwise noted, the terms "a" or "an," as used in the specification and claims, are to be construed as meaning "at least one of." In addition, for ease of use, the words "including" and "having," as used in the specification and claims, are interchangeable with and have the same meaning as the word "comprising." In addition, the term "based on" as used in the specification and the claims is to be construed as meaning "based at least upon."

What is claimed is:

1. A computer-implemented method for injecting code into an application, the method comprising:
   identifying a metadata pointer, wherein the metadata pointer points to a first metadata section in an application startup file, wherein the first metadata section includes application metadata;
   creating a second metadata section in the application startup file;
   copying the application metadata to the second metadata section, wherein the second metadata section includes a full copy of the application metadata of the first metadata section;
   modifying a parameter associated with a stream that includes a string and a set of tables-in the copied application metadata in the second metadata section, wherein the string comprises an injected assembly file, an injected file namespace, and an injected object; and wherein at least a first table of the set of tables comprises a field indicating the injected file namespace and a type of the injected object;
   determining an application startup object, wherein the application startup object is determined based on at least one of an entry point instruction or a reference in a disparate file;
   identifying a constructor code for the application startup object in the copied application metadata based on the determined application startup object;
   modifying the constructor code associated with the application startup file based at least in part on modifying the parameter associated with the stream, wherein at least a second table of the set of tables comprises a field to enable the constructor code to create the injected object of the type based at least in part on the injected assembly file and the injected file namespace; and
   updating the metadata pointer to point to the second metadata section based at least in part on the modified constructor code.

2. The method of claim 1, wherein the second metadata section is created at an end of the application startup file.

3. The method of claim 1, wherein modifying the copied application metadata comprises:
   modifying the copied application metadata to load the injected object.

4. The method of claim 1, wherein modifying the copied application metadata to load the injected object comprises:
   modifying the constructor code for the application startup object to load the injected object as a first step in creating the application startup object.

5. The method of claim 1, wherein the parameter associated with the stream comprises assembly reference information, type reference information, member reference information, or a combination thereof.

6. The method of claim 3, wherein modifying the copied application metadata to load the injected object comprises:
   modifying the copied application metadata to define a constructor for loading the injected object;
   modifying the copied application metadata to add a reference to code for implementing the injected object; and
   modifying the copied application metadata to specify an object name within the code.

7. The method of claim 1, further comprising:
   determining the application startup file, wherein the application startup file is determined based on at least one of an executable file or the disparate file.

8. The method of claim 1, wherein the application startup file comprises a portable executable file.

9. The method of claim 1, wherein the first metadata section comprises a .NET metadata section, and wherein the second metadata section comprises a .NET metadata section.

10. A computing device configured for injecting code into an application, comprising:
    a processor;
    memory in electronic communication with the processor;

instructions stored in the memory, the instructions being executable by the processor to:
identify a metadata pointer, wherein the metadata pointer points to a first metadata section in an application startup file, wherein the first metadata section includes application metadata;
create a second metadata section in the application startup file;
copy the application metadata to the second metadata section, wherein the second metadata section includes a full copy of the application metadata of the first metadata section;
modify a parameter associated with a stream that includes a string and a set of tables, or both in the copied application metadata in the second metadata section, wherein the string comprises an injected assembly file, an injected file namespace, and an injected object; and wherein at least a first table of the set of tables comprises a field indicating the injected file namespace and a type of the injected object;
determine an application startup object, wherein the application startup object is determined based on at least one of an entry point instruction or a reference in a disparate file;
identify a constructor code for the application startup object in the copied application metadata based on the determined application startup object;
modify the constructor code associated with the application startup file based at least in part on modifying the parameter associated with the stream, wherein at least a second table of the set of tables comprises a field to enable the constructor code to create the injected object of the type based at least in part on the injected assembly file and the injected file namespace; and
update the metadata pointer to point to the second metadata section based at least in part on the modified constructor code.

11. The computing device of claim 10, wherein the second metadata section is created at an end of the application startup file.

12. The computing device of claim 10, wherein the instructions executable to modify the copied application metadata comprise instructions executable by the processor to:
modify the copied application metadata to load the injected object.

13. The computing device of claim 10, wherein the instructions to modify the copied application metadata to load the injected object comprise instructions executable by the processor to:
modify the constructor code for the application startup object to load the injected object as a first step in creating the application startup object.

14. The computing device of claim 12, wherein the parameter associated with the stream comprises assembly reference information, type reference information, member reference information, or a combination thereof.

15. The computing device of claim 12, wherein the instructions to modify the copied application metadata to load the injected object comprise instructions executable by the processor to:
modify the copied application metadata to define a constructor for loading the injected object;
modify the copied application metadata to add a reference to code for implementing the injected object; and
modify the copied application metadata to specify an object name within the code.

16. A computer-program product for injecting code into an application, the computer-program product comprising a non-transitory computer-readable medium storing instructions thereon, the instructions being executable by a processor to:
identify a metadata pointer, wherein the metadata pointer points to a first metadata section in an application startup file, wherein the first metadata section includes application metadata;
create a second metadata section in the application startup file;
copy the application metadata to the second metadata section, wherein the second metadata section includes a full copy of the application metadata of the first metadata section;
modify a parameter associated with a stream that includes a string and a set of tables, or both in the copied application metadata in the second metadata section, wherein the string comprises an injected assembly file, an injected file namespace, and an injected object; and wherein at least a first table of the set of tables comprises a field indicating the injected file namespace and a type of the injected object;
determine an application startup object, wherein the application startup object is determined based on at least one of an entry point instruction or a reference in a disparate file;
identify a constructor code for the application startup object in the copied application metadata based on the determined application startup object;
modify the constructor code associated with the application startup file based at least in part on modifying the parameter associated with the stream, wherein at least a second table of the set of tables comprises a field to enable the constructor code to create the injected object of the type based at least in part on the injected assembly file and the injected file namespace; and
update the metadata pointer to point to the second metadata section based at least in part on the modified constructor code.

\* \* \* \* \*